R. L. ELLERY.
METHOD OF MAKING HEADED ARTICLES.
APPLICATION FILED SEPT. 4, 1914.

1,290,529. Patented Jan. 7, 1919.

WITNESSES:-
R. G. Allen.
F. E. Aul.

INVENTOR.
Robert L. Ellery,
By Owen, Owen & Crampton
His attys.

UNITED STATES PATENT OFFICE.

ROBERT L. ELLERY, OF TOLEDO, OHIO, ASSIGNOR, BY MESNE ASSIGNMENTS, TO PFANSTIEHL COMPANY INC., A CORPORATION OF NEW YORK.

METHOD OF MAKING HEADED ARTICLES.

1,290,529.  Specification of Letters Patent.  Patented Jan. 7, 1919.

Application filed September 4, 1914. Serial No. 860,162.

*To all whom it may concern:*

Be it known that I, ROBERT L. ELLERY, a citizen of the United States, and a resident of Toledo, in the county of Lucas and State of Ohio, have invented a certain new and useful Method of Making Headed Articles, and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to metallurgy, and particularly to the molding of a tungsten steel alloy head to a carbon steel shank, but is not restricted to such use as it may be used in any connection for which it may be adapted or appropriate.

It is found in practice that in molding a steel alloy such, for instance, as tungsten steel to a metal shank of a different nature, such as carbon steel, which shank has a relatively large flattened surface at the end thereof to which the head is molded, that a gas forms between the head metal and the shank end and renders the head hollow to a greater or less extent and consequently defective and unfit for use.

The object of my invention is to improve upon the manufacture of articles of the character described whereby the heads are perfectly molded onto the shanks in an exceedingly secure and rigid manner, and the liability of defects by reason of blow holes or gas bubbles occurring in the heads is reduced to a minimum.

The invention is fully described in the following specification, and while, in its broader aspect, it is capable of embodiment in numerous forms, a preferred and a few modified forms thereof are illustrated in the accompanying drawings in which,—

Figure 1:
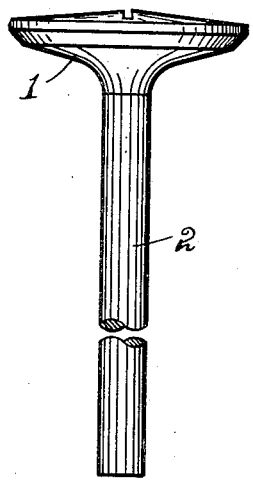
Figure 2:
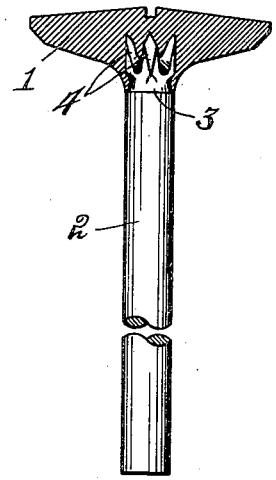

Figure 1 is a side elevation of an article embodying the invention. Fig. 2 is a similar view thereof with the head in section, and Figs. 3, 4, 5, 6 and 7 illustrate different forms of shank ends embodying the invention.

In carrying out my invention the flattened surface of the shank at the end thereof to which the head is molded is either entirely eliminated or is reduced to such an extent as to negative or minimize the forming of gas bubbles within the head over and around the shank end. It is found that this may be accomplished in numerous ways, as by providing the shank end with a plurality of pointed prongs, or making it conical, V-form, oval or frusto-conical, as illustrated in the different figures of the drawing, or it may be made in other shapes so long as the end of the shank substantially terminates in a pointed, sharpened or rounded end.

Figures 3, 4, 5, 6, 7:
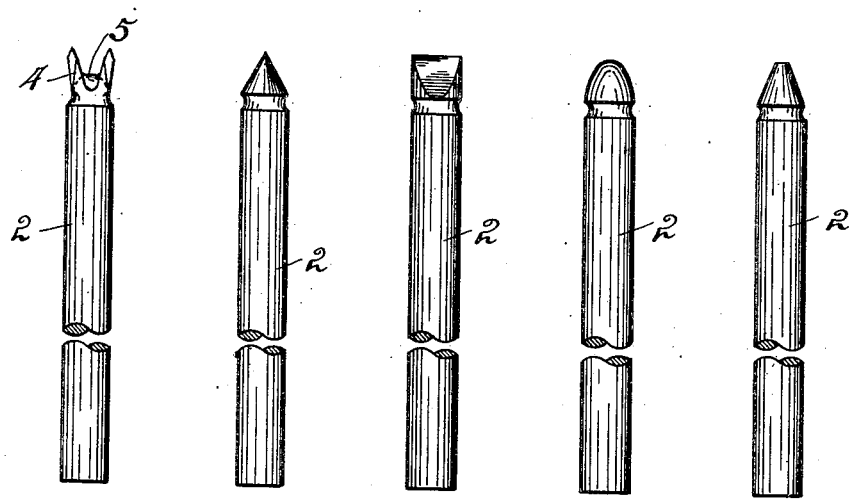

It is found in practice, however, that the best results are obtained by providing the shank end with a plurality of sharpened prongs or projections, as indicated at 4 in Figs. 2 and 3, as such prongs in addition to preventing the formation of gas bubbles within the head also coöperate with the head metal to provide a more secure and rigid uniting of the head and shank than is obtained by the use of a single point, or by a shaping of the shank end, as indicated in Figs. 4, 5, 6 and 7.

The article illustrated in Figs. 1 and 2 of the drawings is a puppet valve of which 1 is the head and 2 the shank. The head is molded over and around the end of the shank when the latter is in a cold state, and in order to firmly secure the two together, it has been customary to provide the latter with a surrounding groove 3 into which the head metal may flow and have an interengaging action with the shank.

When a plurality of prongs 4 are employed they are arranged in laterally spaced relation and project from the end of the stem longitudinally thereof and have their outer ends sharpened to prevent a forming of gas bubbles between such ends and the head metal. The portion of the stem metal which is disposed centrally of the several prong bases and between adjoining prongs is convexed or tapered in form, as indicated at 5, to prevent the forming of gas bubbles thereon between the prongs. The prongs 4 preferably project outwardly from the groove 3, as shown.

The provision of one or more points or prongs on the end of a shank to which a head 1 is molded has a further advantage in that the small cross area of the prongs permits a high heating of the same by the head metal and a consequent welding of the head and prongs together. This is found to be a very important feature in articles of the character described as the head is thereby prevented from becoming loosened on the stem due to expansion and contraction under changing temperatures.

It is found in practice that the best molding results are obtained by throwing about .0025 of manganese into the metal just before being poured to quiet it.

I wish it understood that my invention is not limited to any specific construction, arrangement or form of the parts except in so far as such limitations are specified in the claims.

Having thus described my invention, what I claim as new, and desire to secure by Letters Patent, is,—

1. The method of casting alloy steel heads onto steel shanks of a different nature which consists in providing an end of the shank with a plurality of longitudinally projecting prongs which are sharpened at their outer ends and convexing the portion of the shank located between the bases of the prongs, the head being then cast onto said end of the shank.

2. The method of casting an alloy steel head onto a single piece shank of a different nature which consists in providing an end of the shank with a plurality of integral pointed prongs and casting the head onto and over said end of the shank, the metal first poured forming the head and heating the shank prongs to effect an integral welding of the head and prongs.

3. The method of casting a tungsten steel head onto a single piece carbon steel shank, which consists in providing an end of the shank with a plurality of integral pointed prongs extending longitudinally of the shank, and casting the head onto and over said prongs with its inner side embedding the shank beyond the bases of said prongs, the head metal heating said prongs and effecting an integral welding of the head and prongs.

4. The method of casting a tungsten steel head onto a single piece carbon steel shank, which consists in providing an end of the shank with a plurality of longitudinally extending integral pointed prongs and with a surrounding recess adjacent to the bases of said prongs, and casting the head onto and over said end in prong embedding relation with a part thereof filling said recess, the metal of the head heating the prongs and effecting an integral welding of the two.

5. The method of preventing the formation of cavities in the interior of alloy steel bodies cast about the end of steel rods which comprises forming a point on the end of the rod, and casting the alloy steel around the said end of the rod.

In testimony whereof, I have hereunto signed my name to this specification in the presence of two subscribing witnesses.

ROBERT L. ELLERY.

Witnesses:
F. E. AUL,
R. G. ALLEN.